Patented May 8, 1923.

1,454,616

UNITED STATES PATENT OFFICE.

EUGENE E. AYRES, JR., OF CHESTER, PENNSYLVANIA, ASSIGNOR TO THE SHARPLES SPECIALTY COMPANY, OF PHILADELPHIA, PENNSYLVANIA, A CORPORATION OF DELAWARE.

PROCESS FOR RESOLVING EMULSIONS.

No Drawing.     Application filed February 10, 1921. Serial No. 443,762.

*To all whom it may concern:*

Be it known that I, EUGENE E. AYRES, Jr., a citizen of the United States, residing at Chester, in the county of Delaware and State of Pennsylvania, have invented a new and useful Process for Resolving Emulsions, of which the following is a specification.

This invention is a process for resolving emulsions by the use of a reagent that will dissolve in the continuous phase of the emulsion, and will therefore come automatically into contact with the suspended globules constituting the disperse phase, and yet will act as an emulsifying colloid soluble in or wetted by the disperse phase to counteract the stabilizing influence of the emulsifying colloids soluble in or wetted by the continuous phase.

The primary purpose of my improvement is to effect the efficient resolution of emulsions that can not be resolved satisfactorily by previously known methods.

It is well known that emulsions may be composed of oil-in-water, or water-in-oil, the form depending upon the nature of the constituents of the emulsion. For example, emulsions of fresh or salt water with crude petroleum are composed of small globules of water suspended in the oil. Some emulsions of this type, particularly when the viscosity of the oil is great, are difficult to resolve so as to produce sufficiently dry oil and sufficiently oil free water. An example of the opposite type of emulsion is found in cotton seed oil soap stock, a by-product from the caustic soda refining of cotton seed oil, which when diluted is in the main composed of aqueous soap solution with oil globules suspended therein.

It is known that the stability of emulsions is usually dependent on the properties emulsifying colloids. If the emulsifying colloid is in the water, water will be continuous and the emulsion will be of the type of oil-in-water, but if the emulsifying colloid is in the oil, oil will be continuous and the emulsion will be of the type of water-in-oil.

For the purpose of simplifying my description I shall refer to those emulsifying colloids which tend to give emulsions of continuous oil and dispersed water as hydrophobes, while those emulsifying colloids which tend to give emulsions with continuous water and dispersed oil will be referred to as hydrophiles.

Sodium soap is a common example of a hydrophile colloid and emulsions of oil and water containing a sodium soap will have continuous water with suspended oil, or in other words, will be of the type of oil-in-water. Crude petroleum contains some hydrophobe colloids and emulsions of crude petroleum therefore have continuous oil with dispersed water.

It is also known that if an emulsifying colloid of opposite character to the emulsifying colloid already present be put in contact with an emulsion, the stability of the emulsion will be reduced or destroyed. If both hydrophobes and hydrophiles are present in an emulsion, the form which the emulsion will take (oil-in-water or water-in-oil) will depend upon the predominance of the hydrophobe or hydrophile. For example, it is common practice to add sodium soap to an emulsion of water-in-oil to break this emulsion, the soap counteracting the stabilizing influence of the hydrophobe present in the oil with a tendency to make the emulsion of the opposite, or oil-in-water, type. In practice the amount of soap used is less than required to reverse the emulsion and merely enough to so reduce the stability that the globules of water may coalesce and be separated by gravity or centrifugal force.

As an example of the opposite type of emulsion, it is well known that if calcium soap, which is a hydophobe colloid, be added to an emulsion of oil-in-water containing sodium soap, the oil-in-water emulsion may be made less stable or may be completely reversed to an emulsion of water-in-oil, depending upon the relative amounts of sodium soap and calcium soap present.

An objection to these known procedures is that their success depends upon the highly efficient mechanical admixture of the reagent with the emulsion, and in very few cases is it possible to obtain such admixture as to produce satisfactory results. The aqueous soap solutions commonly employed to reduce the stability of water-in-oil emulsions are not soluble in the continuous oil of the emulsion, and inasmuch as the favorable action of the soap on the emulsion is dependent upon the introduction of the soap to the dispersed water globules, it is necessary to efficiently emulsify the soap solution with the oil emulsion. The contact of globules of soap water with globules of the dispersed water already present in the oil emulsion is a matter of chance, and may rarely be considered complete. When calcium oleate has been used as a reagent to resolve oil-in-water emulsions, the calcium oleate, which is a solid material insoluble in water, has been ground with the emulsion or else dissolved in oil and the oil emulsified with the emulsion, with the hope that the particles of calcium oleate will touch the oil globules in suspension and cause them to agglomerate.

It may readily be seen, therefore, that although the principle of using such corrective emulsifying colloids is a correct principle, the method of introducing the emulsifying colloids is inefficient. The results from such operations on these emulsions are sometimes negative.

I have found that it is possible and practicable to prepare reagents that will disperse as colloids in the continuous phase and yet that act as emulsifying colloids soluble in or wetted by the dispersed phase. In other words, it is possible to produce an effect of oil soluble hydrophiles and water soluble hydrophobes. The fact that my reagents are colloidally soluble in the continuous phase means that the contact between the reagent and the dispersed phase is automatic and complete, not dependent upon agitation or emulsification, and in no sense fortuitous. For example, if it is required to introduce soap to the dispersed water of a water-in-oil emulsion, it is possible to prepare a reagent soluble in oil and yet containing soap. Conversely, if it is required to introduce calcium oleate to the dispersed oil of an oil-in-water emulsion, it is possible to prepare a reagent that is soluble in water and yet contains calcium oleate.

I have obtained excellent results with a reagent consisting of about 25% of sodium soap, 10% of water, and 65% of oleic acid. Such a reagent may be prepared in such fashion as to render it colloidally soluble in oil. I have likewise obtained excellent results with a reagent composed of 4% of calcium oleate dissolved in a mixture of 50% alcohol and 50% glycerol, with 1% of gelatine added as a stabilizer. Such a reagent is colloidally soluble in water, and yet contains a hydrophobe colloid, calcium oleate.

There are many such reagents that may be easily prepared in the laboratory and that act efficiently to resolve, or to aid in the resolution of emulsions of one type or the other.

In illustration of the practice of my process I have added 1% by weight of a reagent composed of 40% water, 35% free rosin, and 25% sodium rosin soap, to an emulsion of viscous oil with water, stirring the mixture to promote the solution of the reagent in the emulsion, and centrifuging the product with resultant separation of the agglomerated water from the oil. The continuous oil phase and sodium resinate are mutually soluble in rosin.

It has been found in the practice of my process that a small amount of the reagent is usually sufficient to accomplish the results desired. Hence I do not limit myself to any fixed percentage, but it will be understood that the amount added will be less than the amount required to reverse the type of the emulsion.

I have noticed that in the case of very viscous emulsions of either type it is necessary to use high centrifugal force to effect sufficiently rapid and complete subsidence of the water from the oil or the oil from the water after the use of this reagent, although the resolution may be partially effected by gravity settling.

It is possible by the use of my process, involving the reagent described, to remove water from oil emulsions that otherwise cannot be dehydrated, it being practicable by such process to resolve emulsions that cannot be resolved by the use of reagents for softening the water by the precipitation of the alkaline earths.

It is possible by the use of my process, in which the use of the above mentioned reagents is followed by the application of high centrifugal force, to remove oil from oil-in-water emulsions from which otherwise oil can be recovered only by solvent extraction.

Having described my invention, I claim:—

1. The process of resolving emulsions which consists in the addition to the emulsion of a reagent which disperses as a colloid in the continuous phase of the emulsion and acts as an emulsifying colloid which tends to reverse the form of the emulsion.

2. The process of resolving an emulsion which consists in the addition thereto of a reagent which dissolves in the continuous phase thereof, acts as an emulsifying colloid which tends to reverse the form of the emulsion, said reagent contacting with the globules of the disperse phase and causing them to coalesce.

3. The process of resolving an emulsion which consists in the addition thereto of a reagent comprising a substance, which acts as an emulsifying colloid tending to reverse the form of the emulsion, and a second substance in which said first substance and the continuous phase are soluble.

4. The process of separating the constituents of an emulsion which consists in dissolving a substance, having the property of acting as an emulsifying colloid of the class which would tend to reverse the form of the emulsion, in a substance adapted to produce therewith a reagent that is soluble in the continuous phase, adding the reagent to the emulsion, and subjecting the product to subsidence.

5. The process of resolving emulsions of the type of water-in-oil which consists in the addition to the emulsion of a reagent which has the property of dispersing as a colloid in the continuous oil phase of the emulsion and which comprises a hydrophile colloid.

6. The process of separating the constituents of water-in-oil emulsions which consists in the addition to the emulsion of a reagent composed of a solution of a hydrophile colloid in a substance soluble in the continuous oil phase of the emulsion, said reagent being characterized by its capacity for automatically contacting with the dispersed water globules and causing them to coalesce.

7. The process of separating the constituents of water-in-oil emulsions which consists in the addition to the emulsion of a reagent composed of a hydrophile colloid dissolved in a substance in which the continuous oil phase and the aforesaid hydrophile colloid are mutually soluble.

8. The process of separating the constituents of water-in-oil emulsions which consists in dissolving a hydrophile colloid in a substance adapted to produce therewith a reagent that is soluble in the continuous oil phase, adding the reagent to the emulsion, and separating the constituents by subsidence.

9. The process of separating the constituents of water-in-oil emulsions which consists in the addition to the emulsion of a reagent composed of sodium resinate dissolved in a substance in which the continuous oil phase is also soluble.

10. The process of separating the constituents of water-in-oil emulsions which consists in dissolving sodium resinate in a substance adapted to produce therewith a reagent that is soluble in the continuous oil phase, adding the reagent to the emulsion, and separating the constituents by subsidence.

11. The process of separating the constituents of petroleum emulsions which consists in the addition to the emulsion of a reagent composed of a solution of sodium resinate in a substance soluble in petroleum.

12. The process of separating the constituents of a petroleum emulsion which consists in dissolving sodium resinate in a substance adapted to produce therewith a reagent that is soluble in petroleum, adding the reagent to the emulsion, and separating the constituents by subsidence.

In testimony whereof I have hereunto set my name this 9th day of February, 1921.

EUGENE E. AYRES, Jr.